Dec. 22, 1936. J. R. FREEZE 2,065,368
CORRUGATED METALLIC CONDUITS AND PROCESSES OF MAKING THEM
Filed Sept. 20, 1935 6 Sheets-Sheet 2

INVENTOR
JONATHAN ROY FREEZE.
BY
ATTORNEYS.

Dec. 22, 1936.  J. R. FREEZE  2,065,368
CORRUGATED METALLIC CONDUITS AND PROCESSES OF MAKING THEM
Filed Sept. 20, 1935   6 Sheets-Sheet 3

INVENTOR
JONATHAN ROY FREEZE.
BY Allen & Allen
ATTORNEYS.

Dec. 22, 1936. J. R. FREEZE 2,065,368
CORRUGATED METALLIC CONDUITS AND PROCESSES OF MAKING THEM
Filed Sept. 20, 1935 6 Sheets-Sheet 4

INVENTOR
JONATHAN ROY FREEZE.
BY
ATTORNEYS.

Dec. 22, 1936.  J. R. FREEZE  2,065,368
CORRUGATED METALLIC CONDUITS AND PROCESSES OF MAKING THEM
Filed Sept. 20, 1935   6 Sheets-Sheet 5

INVENTOR.
JONATHAN ROY FREEZE.
BY *Allen & Allen*
ATTORNEYS.

Dec. 22, 1936.  J. R. FREEZE  2,065,368
CORRUGATED METALLIC CONDUITS AND PROCESSES OF MAKING THEM
Filed Sept. 20, 1935  6 Sheets-Sheet 6

INVENTOR
JONATHAN ROY FREEZE.
BY Allen & Allen
ATTORNEYS.

Patented Dec. 22, 1936

2,065,368

UNITED STATES PATENT OFFICE 2,065,368

CORRUGATED METALLIC CONDUITS AND PROCESSES OF MAKING THEM

Jonathan Roy Freeze, Middletown, Ohio, assignor to The American Rolling Mill Company, Middletown, Ohio, a corporation of Ohio Application September 20, 1935, Serial No. 41,437

9 Claims. (Cl. 113—33)

This is an improvement over my copending application of the same title, Serial No. 499,844, filed December 3, 1930.

My invention relates to pipe formed of sheet metal and having transverse corrugations. Such pipe is in widespread public use as culverts and the like. It is regularly manufactured by taking rectangular pieces of galvanized sheet metal and running them through a pair of corrugating rolls with the longer dimension of the sheet parallel to the axis of the rolls. The rolls are corrugated or fluted longitudinally. The purpose of forming corrugations in the sheet parallel to the longer dimension thereof is to secure sufficient length in the sheet to give the desired circumference to the pipe. The corrugated sheet is then bent or curved by suitable means into an arcuate form. The usual mechanism employed comprises three transversely corrugated rolls adjustable relatively to each other. In one commercial operation the sheet is bent to form the entire circumference of a conduit and the ends are riveted together, the length of the conduit being attained by joining together additional sections with the longitudinal joints in staggered relationship. In another somewhat less common commercial construction corrugated sheets are bent into half circles forming nestable sections, and means are provided for joining the sections together on the job.

The corrugations as formed in the sheets comprise circular arcs connected by tangents. For all gauges of metal the commercial depth of the corrugation is one-half inch, and the pitch or distance between successive crests or valleys is two and two-thirds inches. All of the machinery employed in culvert plants is designed to fabricate this type of corrugation only. For this reason it has never been deemed feasible to depart from the existing standard, demands for increased strength being met by furnishing sheets of different gauge.

The choice of gauge has largely been determined of course, by the size of the finished conduit and the strength requirements which it must meet; but it has not been possible to maintain commercially a completely logical relationship of gauge to size and strength. Commercial culverts or conduits now range from 16 gauge for the smaller diameter up to 8 gauge for large culverts, bridges and the like. From 60 inches diameter to 120 inches diameter the gauge remains the same, an obvious inconsistency due to manufacturing difficulties.

The reasons why this is so are inherent in the machinery and processes employed for making culverts. As hereinabove explained, the mechanism for corrugating sheets comprises a heavy pair of corrugating rolls of a length sufficient to accommodate the longest sheet of metal which it is desired to use. Attempts to employ this mechanism for corrugating sheets heavier than 8 gauge have not been successful because obviously the machinery is not heavy enough. The rolls spring, producing corrugations which are shallower in the center of the sheet than at the edges thereof; and the heavy pressure on the rolls in corrugating so thick a sheet results in a disrupting of the galvanized coating thereon and a destruction of its protective efficiency. The same considerations apply to the bending rolls as to the corrugating rolls; and with very heavy sheets, such as those over 8 gauge, the bending rolls themselves disrupt the coating.

My invention relates essentially to culverts of the heavier type. One of its objects is the simplification of the manufacture of such culverts or conduits. In the commercial manufacture of conduit up to, say, 48 inches in diameter, the sheets after corrugating have a width of approximately 24 inches and a length equivalent to the circumference of the conduit plus an allowance for a lapped seam. The sheets are formed into cylindrical sections 24 inches in length and are riveted together in machines especially designed for the purpose. Conduits are thus commercially made up in lengths which are multiples of 2 feet. Where the diameter exceeds, say, 54 inches, two sheets and in some cases more are used to form the circumference of a single section. With large diameters it is frequently necessary to provide a pit in front of the riveting machines; and the handling of culvert sections and the building up of lengths of conduit becomes an exceedingly cumbersome operation. This is avoided in my invention.

Another object of my invention is the provision of a process whereby the gauge may follow the size and strength requirements of large size culverts. An ancillary object of my invention is the provision of a process of corrugating metal essentially heavier than 8 gauge, and of providing heavier corrugated culvert sections with completely protective galvanized coatings.

Still other objects of my invention are the provision of novel conduit sections and conduits formed thereof, as will hereinafter be more fully set forth.

Other important objects of my invention relate to the provision of sectional or unit structures which may be assembled in the field, and the provision of constructions which facilitate this.

These and other objects of my invention which will be set forth hereinafter or will be apparent to one skilled in the art upon reading these specifications, I accomplish by that certain process and in that certain construction and arrangement of parts of which I shall now describe exemplary embodiments, reference being had to the accompanying drawings.

In the practice of my invention, I form a culvert or conduit from a plurality of curved and corrugated metal plates or sheets which plates, however, are not bent to constitute the entire periphery of a conduit nor to so great a curvature as would cause them to constitute substantially 180 degrees of the circumference of a conduit. On the contrary, my plates as ordinarily formed are intended to constitute no more usually than one quarter of the circumference of the completed culvert for reasons which will hereinafter be made plain. In many instances more than four of my plates are used in the formation of the full circumference of a conduit.

Figures 4, 5, 7:
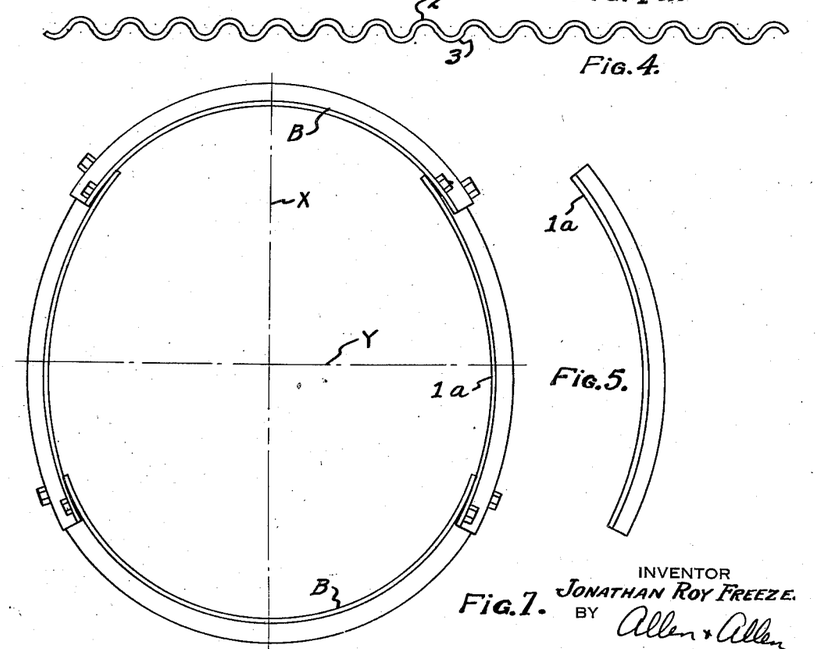
Fig. 4 is an edge view of a flat corrugated plate used in making the culvert or conduit of my invention.
Fig. 5 shows such a corrugated plate curved to the desired radius.
Fig. 7 shows a representative conduit of elliptical shape formed with my sections.
Figure 4A:
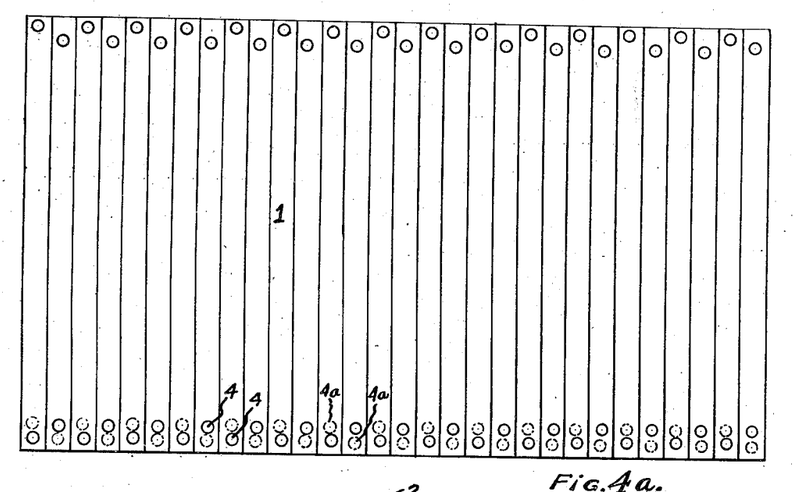
Fig. 4a is a plan view of Fig. 5.
Figure 6:
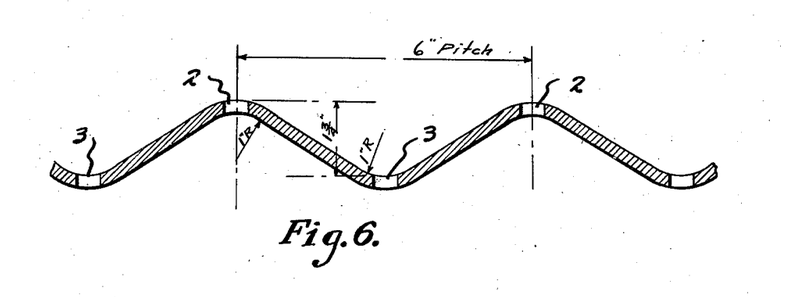
Fig. 6 is a section of a representative corrugated plate, taken along lines of perforations.

In meeting the practical problems of the formation of heavy corrugated conduits of large diameter, I am enabled to corrugate heavier sheet or plate metal by corrugating the said metal along its shorter rectangular dimensions, rather than along its longer rectangular dimension, as shown in Fig. 4. I am enabled to do this because I do not intend, after corrugating my sheets or plates, to bend them to a full circle or even to as much as a half circle; but on the contrary, I bend my sheets or plates to an arc which is comparatively a small portion of an entire circumference, and I build up a pipe or conduit by joining together more than two of such corrugated and curved plates. Corrugating the plates along their shortest dimension permits me to use thicker, heavier and shorter rolls, whereby I can handle heavier metal pieces with entire satisfaction. I have shown in Fig. 4a a sheet of metal of heavy character treated so as to present corrugations having crests 2 and valleys 3 as viewed from the edge in Fig. 4. In Fig. 6, I have drawn to scale a representative heavy corrugated sheet in which the circular curvature of the valley portions 3 has a radius of one inch. The depth of the corrugations, i. e., the vertical distance between a valley 3 and a crest 2 is 1¾ inches, while the pitch of the corrugations, i. e. the horizontal distance between adjacent crests 2, is six inches. It will be understood that the dimensions given are dimensions which differ from the dimensions of ordinary corrugations in commercial culverts or conduits. These dimensions, however, are exemplary, and are not limiting upon the broader aspects of my invention. They represent merely a type of corrugations suitable for heavy work in culverts or conduits, say, 120 inches in diameter. The plate shown as corrugated in Fig. 6 is a piece of six gauge metal. This also is exemplary and not limiting. I pass the corrugated sheet or plate 1 through bending rolls or dies so as to curve it into such a configuration as that shown in Fig. 5, where the curved sheet is indicated at 1a. It will be seen that the curvature of the sheet or plate comprises in this instance only a relatively small part of the entire circumference of a circle of the same radius, and substantially less than half thereof. Before or after curving the plate to the form shown in Fig. 5, I prefer to form in it, by punching or otherwise, a series of holes 4, which may be used for the passage of bolts or rivets in fastening plates together in the formation of the full circumference of a circular or other-shaped section of conduit. At the lower edge of the sheet I have shown holes 4 in solid lines, and holes 4a in dotted lines. If the top edge of the sheet is punched as shown, and the bottom edge as at 4, an arrangement is attained which is of utility for a construction employing an even number of sheets around the circumference. The punching indicated at 4a is a staggered arrangement, and must be used where an odd number of sheets is employed, for in such case the staggered formation would cause misfitting of the bolt holes. This arrangement may, of course, be used for an even number of sheets as well.

Figures 11, 12:
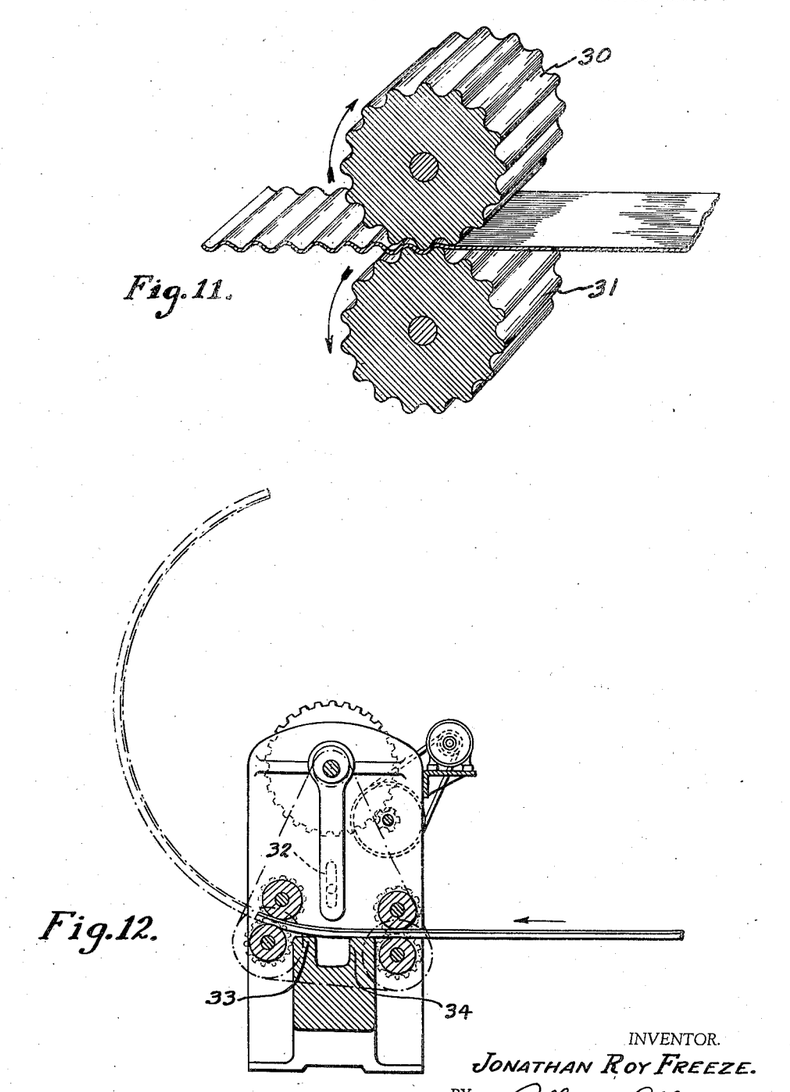
Fig. 11 shows a diagrammatic view of the corrugating rolls.
Fig. 12 shows diagrammatically the bending die apparatus.

In practice, I pass my blank sheets longitudinally through a pair of corrugating rolls, as shown in Fig. 11, and indicated at 30 and 31. Viewed in cross-section, these rolls give the appearance of a pair of mating gears, and the tooth contour is such as to form the desired corrugations. The result is a long and narrow corrugated sheet, with the corrugations parallel with the short dimension of the sheet. Hereinafter the operation will be referred to as roll-corrugating. I have also used for this purpose a platen press comprising male and female dies which are adapted to form one corrugation at a time. I pass the sheet through the press, progressively forming single corrugations by what might be termed a folding process.

Preferably I perform the bending operation as shown in Fig. 12 diagrammatically. I utilize a simple bending press, wherein a power actuated member 32 is caused to bear down between two stationary supports 33 and 34 and in which the stroke of the ram may be adjusted as desired in any well known way. I insert one longitudinal edge of the sheet into the machine, and give it a slight curvature by means of the ram. I then advance the sheet farther into the machine in the direction indicated by the arrow and give it a further curvature; a total of three or four bends as above described will suffice to give my sheet the desired curvature. Obviously the stroke of the ram, or the number of bends given the sheet, is in no way to be considered as a limitation upon my invention, since the greater the stroke, and the more the bends, the greater will be the ultimate curvature of the sheet. The above mentioned operation is hereinafter also referred to as "bending by means of a die".

It is a distinct advantage of my invention that through the steps hereinabove described of forming my plates, I am enabled with particular advantage to do the coating or galvanizing of the plates after their formation as hereinabove described, and after their perforation for the passage of bolts or rivets. Conduits have been made which have been galvanized after their mechanical formation; but the galvanizing operation is inconvenient and cumbersome due to the difficulty of handling completed structures, and is uneconomical due to the length of time involved in it and the difficulty of satisfactorily draining away excess zinc from the convolutions of such completed structures. In galvanizing after fabrication such structures as are shown in my Fig. 5, no such difficulties are met with. This is principally because I am not galvanizing large, bulky completed structures of complex configuration. On the contrary, I am galvanizing plates which have been corrugated and curved but to a relatively small arc. Such plates may be handled very much as sheets are handled and may be conveyed automatically, if desired, to a galvanizing pot or the like, mechanically immersed beneath the surface of the coating metal and mechanically removed therefrom. They do not present a drainage difficulty inasmuch as it is only necessary to remove them from the galvanizing bath along a circular path of movement having a radius not substantially greater than the radius of curvature of the plates themselves. When so removed, they drain readily and do not present pockets in which the galvanizing metal may collect.

Consequently, I prefer to form up the plates of Fig. 5 from uncoated sheets or plates of metal by corrugating and curving them and perforating them where desired, and subsequently to galvanize them and/or otherwise treat them to prolong their life.

Figures 1, 2:
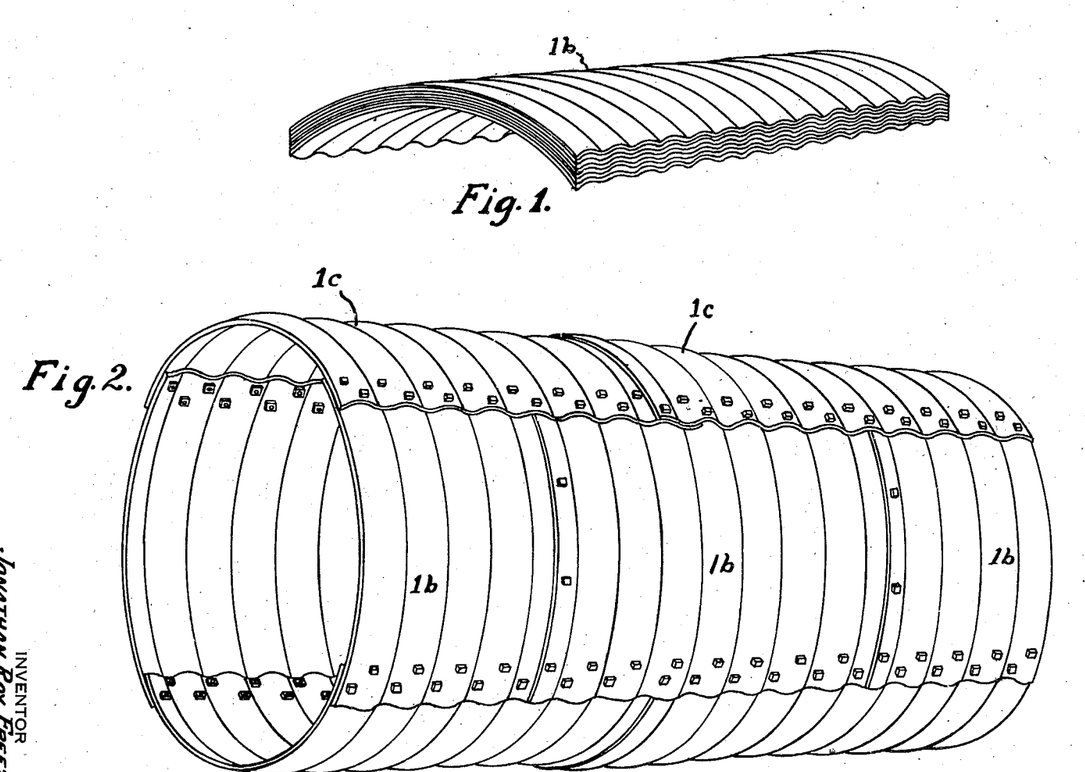
Figure 1 shows a plurality of my culvert sections nested for shipment.
Fig. 2 shows in perspective a representative section of culvert or conduit constructed in accordance with my invention.

In forming up my culverts or conduits as hereinabove indicated, I employ a plurality of the curved and corrugated plates hereinabove described, together with suitable fastening means such as bolts or rivets to hold said plates together, and where desired, suitable means for joining together adjacent sections of conduit as formed. The work of joining the plates and sections together is most advantageously done on the job in heavy construction. This facilitates shipping, and I am thus enabled to nest as shown in Fig. 1, a plurality of the formed and galvanized plates, which I have here indicated at 1b, in a stack, whereby space requirements are greatly cut down.

In the construction of these plates for the reasons hereinabove, I can use (because I can successfully corrugate and bend) metal sheets and plates heavier than those heretofore used in the commercial manufacture of corrugated conduit. My invention facilitates the use of a range of gauges of metal from the heaviest now used to very much heavier gauges for the manufacture of large sized conduits, which range of gauges is equivalent in scope to the range of gauges heretofore in common use for culverts or conduits, say, of 54 inches in diameter and under.

Figure 8:
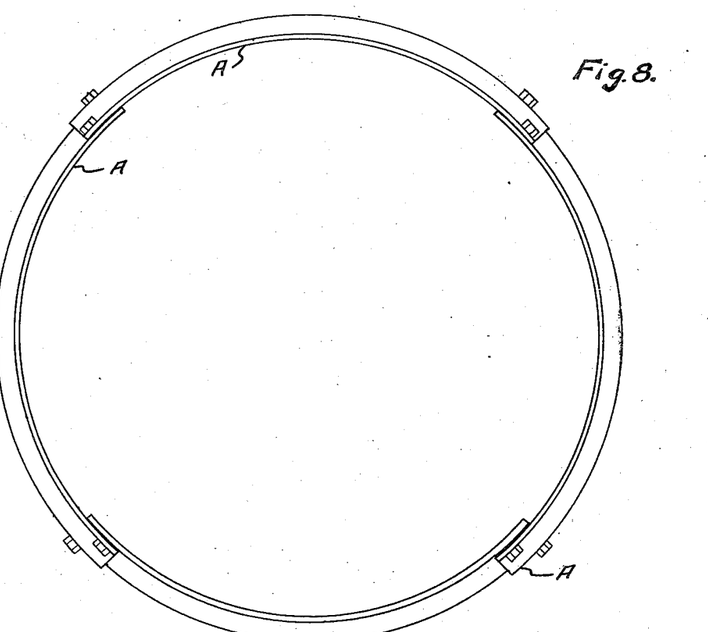
Fig. 8 shows a circular conduit formed with my sections.

I may and I prefer to use a configuration of the corrugation larger in its dimensions than that heretofore used for commercial culvert; and for culverts of different sizes, I may employ different sizes of corrugations. This, however, is not a preferred practice for the reason that it involves a multiplication of manufacturing equipment, and I therefore prefer to select a corrugation size suitable for use with the heavy metal pieces to which my invention is addressed and to meet strength requirements where necessary by gauge variations. I also prefer and for most purposes I have found it entirely practicable to make but two or three different types of corrugated and curved plates, from which two or three types my invention permits me to build up culverts or conduits of a large number of different sizes, some of which sizes have peculiar advantages. In one commercial example of my invention, I may make up two different types of plates. Each will have the same type and size of corrugations so as to be capable of production upon a single machine. The two types of plates will differ from each other chiefly in their radius of curvature. I may make up by way of example, a set of plates having a 30 inch radius and another set of plates having a 45 inch radius. If my plates are produced so as to have a length upon the arc equivalent to a quadrant of a circle, plus an allowance for overlap, by using four plates having a 45-inch radius, I may make as in Fig. 8 a conduit section having a diameter of 90 inches. I have indicated in Fig. 8 plates having a radius of curvature of 45 inches by the letter A. I may also take four plates having a radius of curvature of, say, 30 inches and by joining these together in fours, I may make conduit sections having a diameter of 60 inches. In Fig. 7 I have indicated plates having a radius of 30 inches by the letter B. I may form an elliptical culvert having an internal volume area between the 90 inch and 60 inch culverts hereinbefore described by taking 2 A plates and 2 B plates and joining them as shown in Fig. 7, where I have produced a culvert in which the major axis X is longer than the minor axis Y. From these two types of sections the dimensions of which are of course exemplary only, I may make up additional sizes of culverts or conduits by using some plurality of plates other than four, as will be evident.

In forming up a completed culvert from the plates hitherto described, I prefer to lap and join the plates in such a way that the bottom plate laps inside the two adjacent side plates. When this is done, and when the members are fastened together with separable fasteners as herein set forth, a singular advantage of the construction is that a bottom plate which has become worn or damaged may be removed and a new plate inserted and fastened in its place without disturbing the installation of the culvert.

The elliptical culvert of Fig. 7, in addition to being useful as an intermediate size of conduit capable of being made of standard A and B sections, has additional structural advantages. It has been demonstrated that the inherent strength of corrugated conduit resides in its flexibility. When a corrugated conduit is loaded from above, it deflects, i. e., it flattens very slightly. When it is embedded in earth or the like, as in culvert construction, this flattening pushes the sides of the conduit outwardly, thereby decreasing the pressure upon the top and increasing the pressure upon the sides. In this way the pressure all about a conduit becomes equalized through the flexibility of the conduit itself, and such conduits are capable of sustaining very great loads. In the installation of very large conduits, however, it is not desirable that the conduit be permitted to deflect too much before the pressure on all sides becomes equalized. If this is permitted, the arch will tend to sag. The type of the fill or excavation in which the culvert is installed largely determines the amount of deflection. In many instances it is found advantageous to have the culvert initially assume an elliptical form with the major axis vertical. The deflection of the culvert under load therefore tends to cause the culvert to assume a more truly circular form rather than an elliptical form with the major axis horizontal, which form would obviously be weaker under top loads. Thus the elliptical culvert of Fig. 7 has distinct advantages where it is intended to support top loads of considerable magnitude.

While I may, by a setting of my bending rolls, specially produce curved plates having radii of curvature specifically calculated for culverts made of more than four sections, I find that there is sufficient resiliency in the metal to accommodate itself to ordinary variations in the number of "staves" used to make up quite a wide variety of conduit sizes.

Another advantage of my type of conduit is that for particular requirements the "staves" may have particular characters or be particularly treated. Thus where the conduit is intended to withstand abrasion internally as in culvert work, I may with advantage make the lowermost stave or staves forming the bottom of the culvert of heavier metal than the remaining staves. Or I may otherwise specially prepare them. I may employ if desired, an invert paving in the lowermost stave or staves, which paving may be built into some of the staves at the point of manufacture, the staves being assembled on the job in their proper relationship. Drainage structures deteriorate first in the invert or floor due to the effects of hydraulic traffic. Thus the upper parts of a culvert have a relatively longer life because they are not so intensively subjected to erosive and corrosive action. The bottom of the structure may therefore advantageously receive added protection, as by an invert paving, or be made of heavier material, or of more durable material. The more durable material may be of a different analysis from the material of the sides and top of the conduit so as to gain greater abrasion and corrosion resistance. Among the more durable materials which I may thus employ is a stainless iron or steel. Stainless metal, under present manufacturing conditions is too expensive in most uses to permit the fabrication of the entire conduit therefrom; but my novel construction is especially adapted to the formation of a conduit of ordinary iron or steel and an invert or bottom stave of stainless iron or steel.

Figure 9:
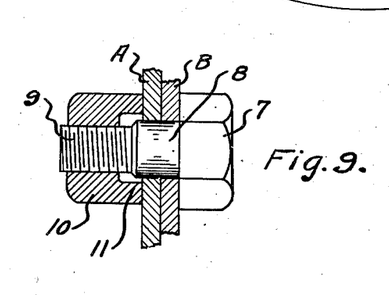
Fig. 9 shows a type of bolt suitable for connecting together the plates to form a conduit of my type or conduit sections as formed.
Figure 10:
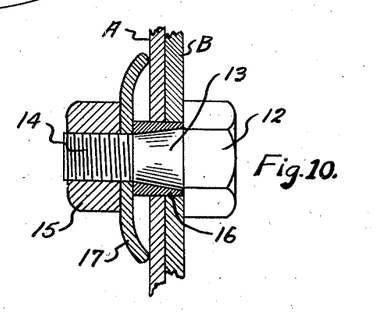
Fig. 10 shows another type of bolt adapted to a similar purpose.

The plates may be fastened together by riveting if desired, but where their assembly is effected on the job, I prefer to use bolts. Since the plates are preferably perforated before galvanizing, the bolts advantageously may be of a self-centering type. I have shown in Fig. 9 one type of bolt which has been found satisfactory. It comprises a head 7, a shank 8, and a threaded portion 9 on the end of the shank. The outer diameter of the threaded portion is preferably less than the outer diameter of the shank 8 so that the threaded portion may be inserted in the holes of plates A and B without damage to the threads even if the perforations are slightly out of line. A nut 10 is provided having a flange portion 11 hollowed out interiorly so as to fit over the shank 8. The tightening of the nut 10 will force the plates over the shank 8 with the perforations in the plates in alignment. I have shown in Fig. 10 another suitable type of bolt having a head 12 and a shank 13 which in this instance is tapered and terminates in a threaded portion 14 as shown. A nut 15 of ordinary type is employed and a split sleeve 16, the internal bore of which is tapered, is placed over the shank 13 after the bolt has been inserted through the holes in the plates A and B. With this type of bolt it is preferable to employ a washer 17, the ends of which are turned down to contact the plate A. A tightening of the nut 15 results in a flattening of the washer and a forcing of the sleeve 16 farther up upon the shank 13 of the bolt, bringing the perforations in plates A and B into exact alignment.

If a fluid tight joint is required between staves, welding may of course, be resorted to in addition to other types of fastening, or the seams may be suitably provided with a fluid-excluding member or construction.

Figure 3:
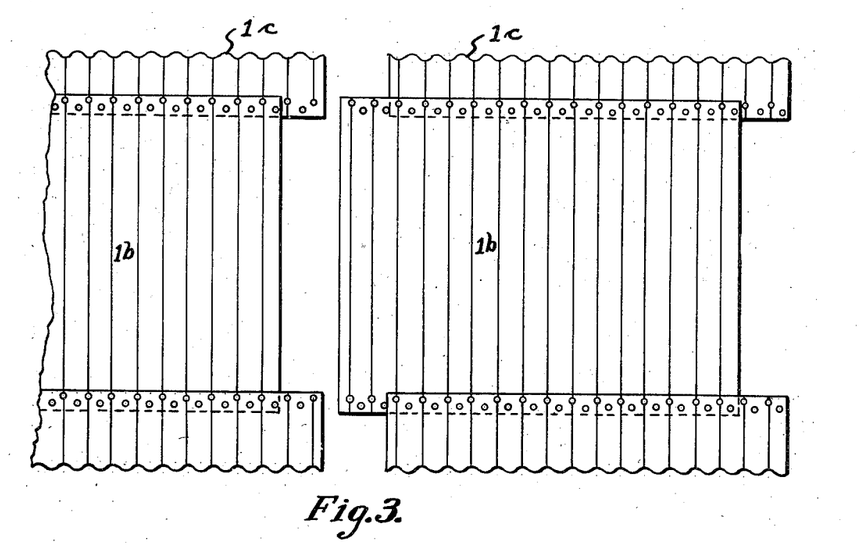
Fig. 3 is an elevation of a conduit showing a different method of making connections between sections.

With bolts of the class described or other suitable fastening means my plates are fastened together to form a culvert or conduit of the desired size and configuration. This may be done at the point of manufacture; but as hereinbefore explained, due to the difficulty of shipping built up conduit in large size, it is in most instances convenient to assemble the plates on the job. When sections are assembled, they are joined together to form a completed conduit of the required length. One method of making joints between sections is illustrated in Fig. 3, in which the plates or staves indicated respectively at 1b and 1c are assembled in offset relationship so that at one end of a section the ends of plates 1b extend beyond the ends of plates 1c, whereas the ends of plates 1c extend beyond the plates 1b at the other. In joining sections, the plates 1b of one section of culvert are those bolted to the plates 1c of an adjoining section of plate. The amount of overlap may be varied but it should be at least sufficient to produce a joint of the required strength. Two full corrugations are usually sufficient overlap; but the overlap may be increased up to one half the length of the plates in the individual sections.

Figure 13:
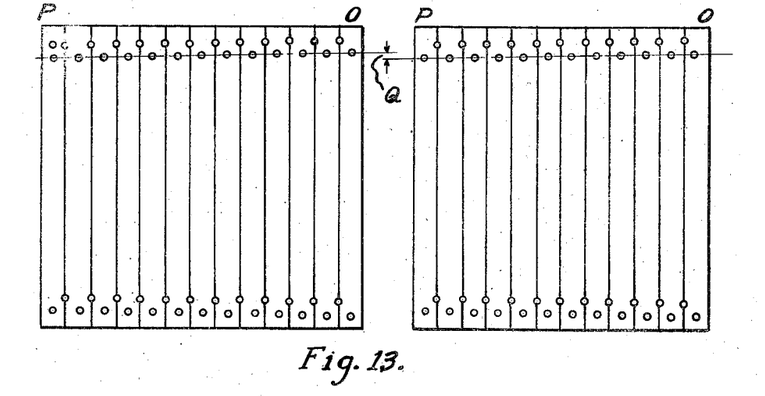
Fig. 13 shows a pair of plates with perforations arranged to permit end lapping.
Figure 14:
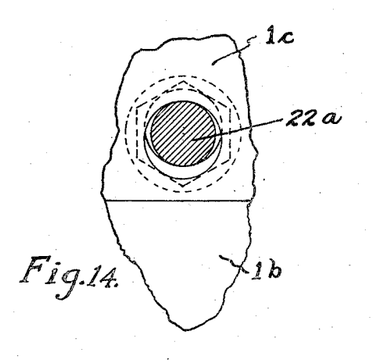
Fig. 14 shows an exemplary relationship of perforations at the start of a joining operation.
Figure 15:
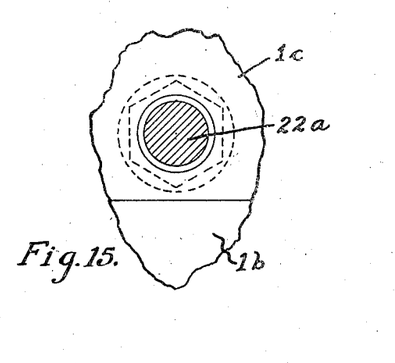
Fig. 15 shows an exemplary relationship of perforations at the finish of a joining operation.

In joints of the type above discussed, where the sections are all lapped in the same direction, the sections are somewhat distorted and are not truly cylindrical, but very slightly conical. In order to permit of the ready bolting or riveting of the sections, and plates of sections, I may form the bolt holes of a diameter larger than the bolts which are to be used therein. Then at one end of the section, the holes of two plates will be in registry with the bolt 22a centered therein, as shown in Fig. 15, while at the other end of the section the bolt 22a will be substantially internally tangent to diametrically opposite walls of the partially registered bolt holes, as shown in Fig. 14. Another manner of overcoming the difficulty above mentioned, is illustrated in Fig. 13, where the distance of the bolt holes from the edges of the sheet is shown as increasing from the region O to the region P. The differential is indicated at Q, and corresponds approximately with the gauge of the sheet.

Figure 16:
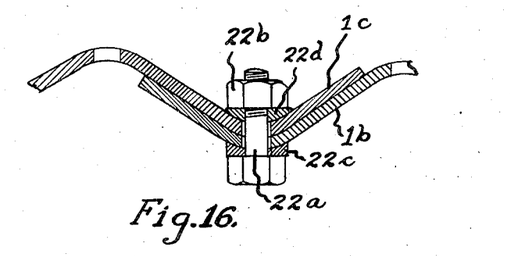
Fig. 16 is a vertical section through an exemplary joint.

In Fig. 16, I have shown a fastening of two sheets by means of a bolt and nut 22a and 22b, respectively, at the bottom of one of the corrugations. The members 22c and 22d are, respectively, plano-concave and plano-convex washers, whose curved portions are made to conform to the curvature of the corrugation of the sheet, whereby a tight joint may be attained. This type of joint is strong and easy to produce but it requires at the start and finish, some plates of less than standard length, and it also has the disadvantage that the edges of longitudinal contiguous staves do not overlap unless special provision is made for this. Thus in some instances it is preferable to employ instead or in addition, a type of joint in which an external band encircles the joint between sections. I have shown in Fig. 2 adjacent sections made up of plates 1b and 1c, which sections are placed together in telescoping relation. In this figure the punching arrangement is that shown in Fig. 4a at 4, since an even number of plates is used around the circumference. Of course if five, or any other odd number of plates is used, the arrangement indicated in Fig. 4a at 4a must be used.

Having thus described my invention, what I claim as new and desire to secure by Letters Patent, is:—

1. A built-up culvert comprising a plurality of ring-like sections telescoping together end to end, each section comprising a plurality of identical curved plates joined together in lapped seams, each plate having fastening apertures extending through its overlapping edge portions, fastening means of less diameter than said apertures extending loosely therethrough, whereby the ends of adjacent sections may be contracted and expanded respectively, to fit one within the other, and said fastening means being capable of being tightened after the sections are telescoped together, to clamp them in permanent relation.

2. A built-up circumferentially corrugated culvert comprising a plurality of ring-like sections telescoping together end to end with corrugations of their telescoped portions in interfitting relation, each section comprising a plurality of identical curved corrugated plates joined together in lapped seams, each plate having fastening apertures extending through its overlapping edge portions, and fastening means of less diameter than said apertures extending loosely therethrough, whereby the ends of adjacent sections may be made of smaller and larger diameter respectively to fit one within the other.

3. The method of making large size culverts which consists in forming a plurality of identical curved plates, providing opposite edge portions of said plates with fastening apertures, assembling a plurality of said plates to form a ring-like culvert section, the adjacent edges of said plates being lapped with their apertures registering, passing fastening members loosely through said apertures, said fastening members being of less diameter than said apertures, whereby the circumference of the section may be slightly increased or decreased, assembling two of said sections end to end, the end portions of said sections being contracted and expanded respectively to fit one within the other, and tightening said fastening members to clamp the end portions of said sections in interfitting relation.

4. A built-up culvert comprising a plurality of ring-like sections telescoping together end to end, each section comprising a plurality of identical curved plates joined together in lapped seams, each plate having fastening apertures extending through its overlapping edge portions, said fastening apertures receding from said edges by degrees from one end of said plates to the other, fastening means extending therethrough, whereby the ends of adjacent sections may be contracted and expanded respectively, to fit one within the other, and said fastening means being capable of being tightened after the sections are telescoped together, to clamp them in permanent relation.

5. A built-up circumferentially corrugated culvert comprising a plurality of ring-like sections telescoping together end to end with corrugations of their telescoped portions in interfitting relation, each section comprising a plurality of identical curved corrugated plates joined together in lapped seams, each plate having fastening apertures extending through its overlapping edge portions, said fastening apertures receding from said edges by degrees from one end of said plates to the other, and fastening means extending therethrough, whereby the ends of adjacent sections may be made of smaller and larger diameter respectively to fit one within the other.

6. A built-up culvert comprising a plurality of ring-like sections telescoping together end to end, each section comprising a plurality of identical curved plates joined together in lapped seams, each plate having fastening apertures extending through its overlapping edge portions, fastening means of less diameter than said apertures extending loosely therethrough, whereby the ends of adjacent sections may be contracted and expanded respectively, to fit one within the other, and said fastening means being capable of being tightened after the sections are telescoped together, to clamp them in permanent relation, said fastening means including washers having one plane face and another face formed to fit the curvature of the corrugations.

7. A built-up circumferentially corrugated culvert comprising a plurality of ring-like sections telescoping together end to end with corrugations of their telescoped portions in interfitting relation, each section comprising a plurality of identical curved corrugated plates joined together in lapped seams, each plate having fastening apertures extending through its overlapping edge portions, and fastening means of less diameter than said apertures extending loosely therethrough, whereby the ends of adjacent sections may be made of smaller and larger diameter respectively to fit one within the other, said fastening means including washers having one plane face and another face formed to fit the curvature of the corrugations.

8. A built-up culvert comprising a plurality of ring-like sections telescoping together end to end, each section comprising a plurality of identical curved plates joined together in lapped seams, each plate having fastening apertures extending through its overlapping edge portions, said fastening apertures receding from said edges by degrees from one end of said plates to the other, fastening means extending therethrough, whereby the ends of adjacent sections may be contracted and expanded respectively, to fit one within the other, and said fastening means being capable of being tightened after the sections are telescoped together, to clamp them in permanent relation, said fastening means including washers having one plane face and another face formed to fit the curvature of the corrugations.

9. A built-up circumferentially corrugated culvert comprising a plurality of ring-like sections telescoping together end to end with corrugations of their telescoped portions in interfitting relation, each section comprising a plurality of identical curved corrugated plates joined together in lapped seams, each plate having fastening apertures extending through its overlapping edge portions, said fastening apertures receding from said edges by degrees from one end of said plates to the other, and fastening means extending therethrough, whereby the ends of adjacent sections may be made of smaller and larger diameter respectively, to fit one within the other, said fastening means including washers having one plane face and another face formed to fit the curvature of the corrugations.

JONATHAN ROY FREEZE.